US008208766B2

(12) United States Patent
Suse

(10) Patent No.: US 8,208,766 B2
(45) Date of Patent: Jun. 26, 2012

(54) METHOD OF SELECTING IMAGE, PROGRAM AND STORAGE MEDIUM FOR THE METHOD, AND IMAGE PROCESSING APPARATUS USING THE METHOD

(75) Inventor: Koichi Suse, Yamato (JP)

(73) Assignee: Ricoh Company, Limited, Tokyo (JP)

( * ) Notice: Subject to any disclaimer, the term of this patent is extended or adjusted under 35 U.S.C. 154(b) by 1246 days.

(21) Appl. No.: 11/945,563

(22) Filed: Nov. 27, 2007

(65) Prior Publication Data

US 2008/0124004 A1 May 29, 2008

(30) Foreign Application Priority Data

Nov. 29, 2006 (JP) .................................. 2006-321125

(51) Int. Cl.
*G06K 9/54* (2006.01)
*G06K 9/60* (2006.01)
(52) U.S. Cl. .......................... 382/306; 707/706; 707/758
(58) Field of Classification Search .................. 382/305, 382/306; 707/706, 758
See application file for complete search history.

(56) References Cited

U.S. PATENT DOCUMENTS

| | | | | |
|---|---|---|---|---|
| 5,760,382 | A * | 6/1998 | Li et al. | 235/436 |
| 5,933,823 | A * | 8/1999 | Cullen et al. | 1/1 |
| 5,995,978 | A * | 11/1999 | Cullen et al. | 1/1 |
| 5,999,664 | A * | 12/1999 | Mahoney et al. | 382/305 |
| 2002/0184186 | A1 * | 12/2002 | Imaichi et al. | 707/1 |
| 2007/0030999 | A1 * | 2/2007 | Hyakutake et al. | 382/100 |
| 2007/0266252 | A1 * | 11/2007 | Davis et al. | 713/176 |
| 2008/0124004 | A1 * | 5/2008 | Suse | 382/306 |

FOREIGN PATENT DOCUMENTS

| | | |
|---|---|---|
| EP | 1 605 377 A2 | 12/2005 |
| JP | 6-303344 | 10/1994 |
| JP | 7-75393 | 8/1995 |
| JP | 11-205558 | 7/1999 |
| JP | 2002-297644 | 10/2002 |
| JP | 2003-244412 | 8/2003 |

(Continued)

OTHER PUBLICATIONS

Roy Want, et al, "Bridging Physical and Virtual Worlds with Electronic Tags" CHI 99 Conference Proceedings Human Factors in Computing Systems, XP-000894242, May 15-20, 1999, pp. 370-377.

(Continued)

*Primary Examiner* — Aaron W Carter
(74) *Attorney, Agent, or Firm* — Oblon, Spivak, McClelland, Maier & Neustadt, L.L.P.

(57) ABSTRACT

An image processing apparatus includes a storage unit, an input unit, a reading unit, a controller, and an output unit. The storage unit stores article images embedded with mark data. The input unit is used to input a search information element for searching an article image. The reading unit reads mark data of each article image stored in the storage unit. The controller controls an analysis function, a determination function, and a selection function. In the analysis function, the mark data read by the reading unit is analyzed. In the judgment function, the read mark data is compared with the search information element and checked whether the read mark data includes an information element matching the search information element. In the selection function, an article image having the read mark data matched to the search information element is selected. The output unit outputs the selected article image.

20 Claims, 11 Drawing Sheets

FOREIGN PATENT DOCUMENTS

| | | |
|---|---|---|
| JP | 2004-48380 | 2/2004 |
| JP | 2004-72527 | 3/2004 |
| JP | 2004-235682 | 8/2004 |
| JP | 2004-348467 | 12/2004 |
| JP | 2005-269617 | 9/2005 |

OTHER PUBLICATIONS

Japanese Office Action issued May 10, 2011, in Patent Application No. 2006-321125.

* cited by examiner

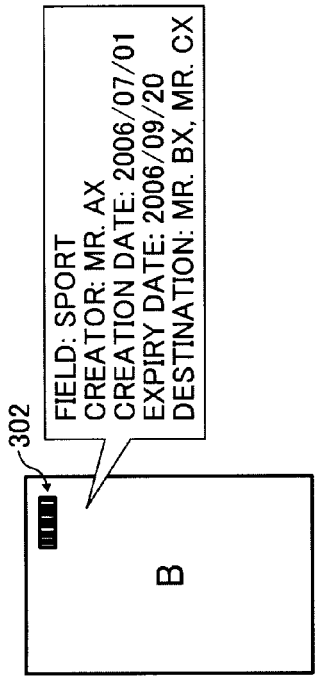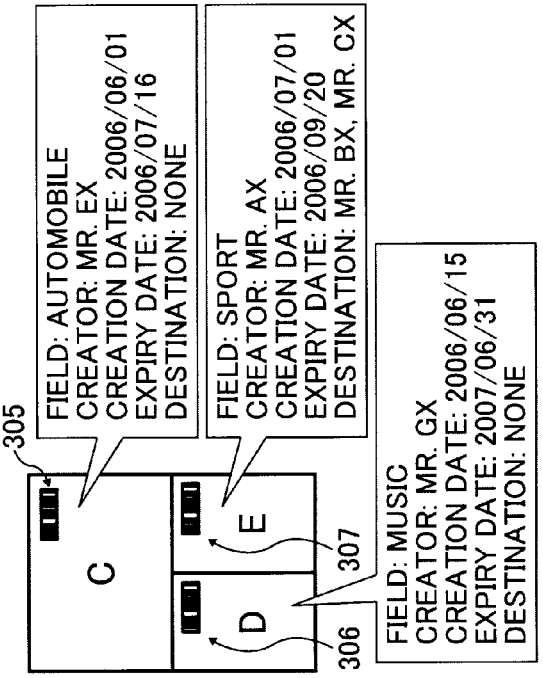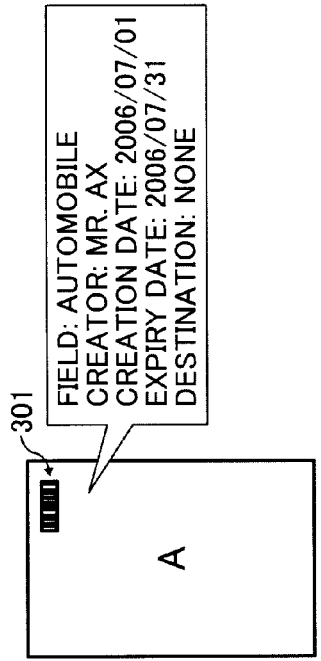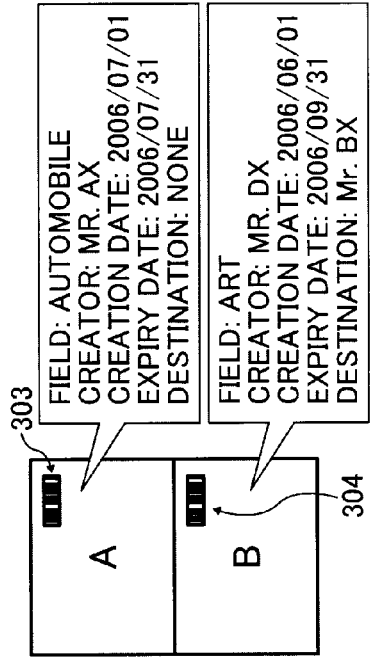

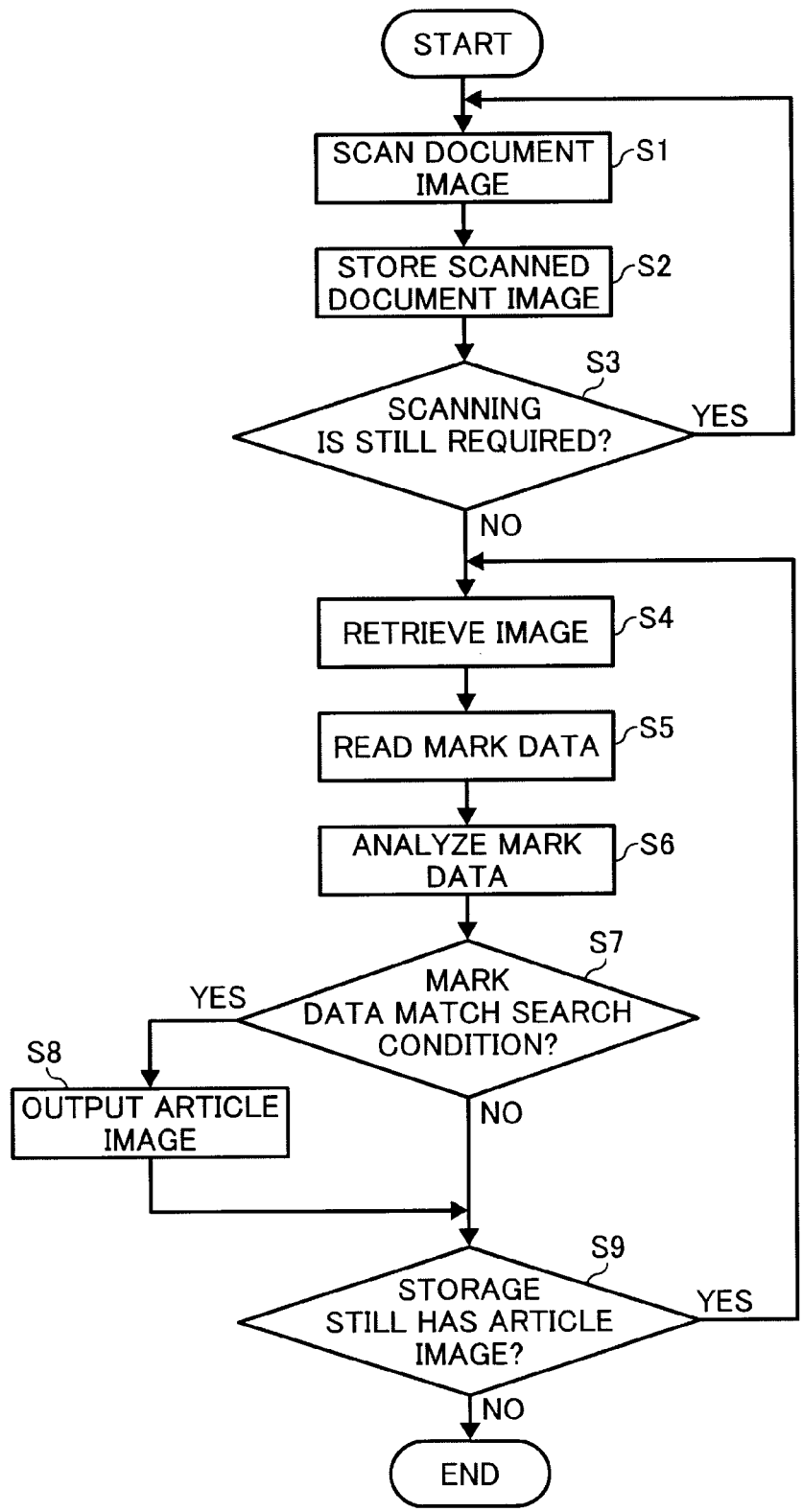

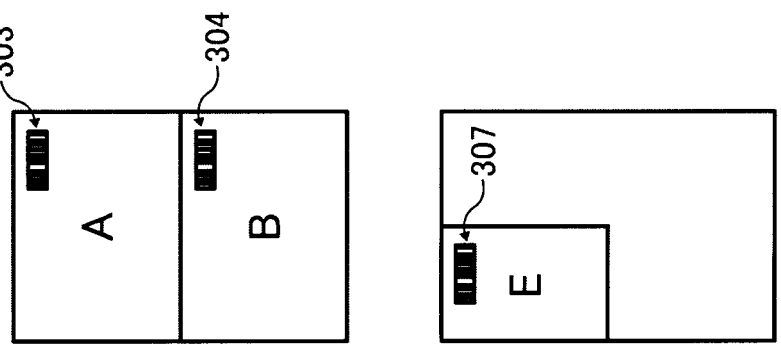
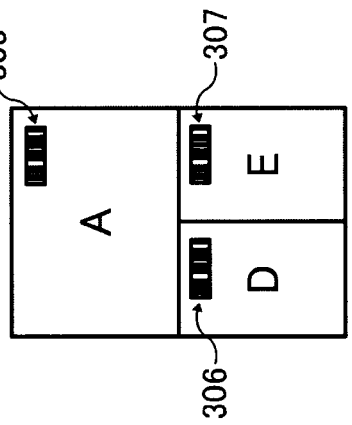
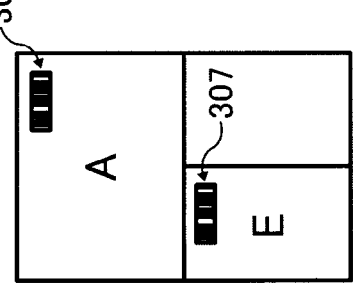
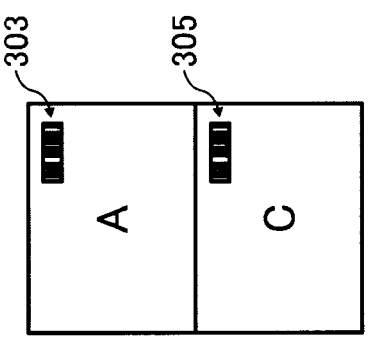

SEARCH CONDITION
USER NAME: MR. BX

FIG. 12
SEARCH CONDITION
FIELD: AUTOMOBILE
OR
EXPIRY DATE: AFTER 2006/09/01
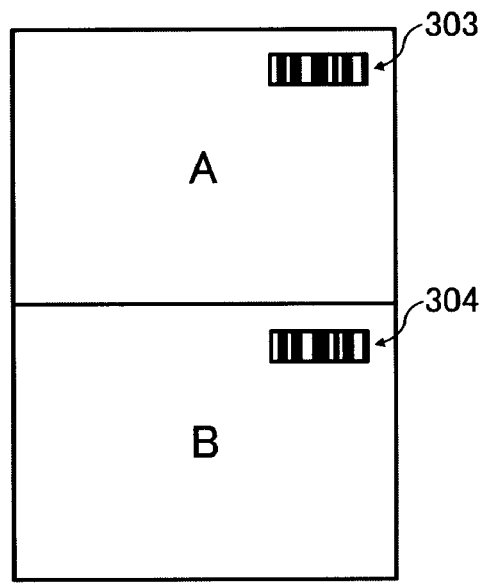
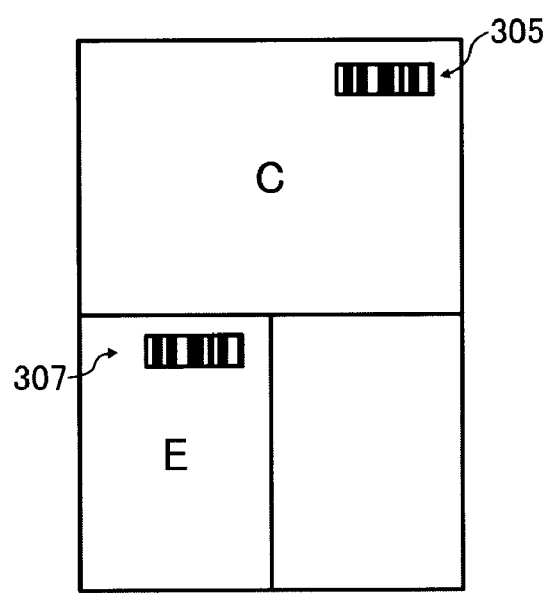

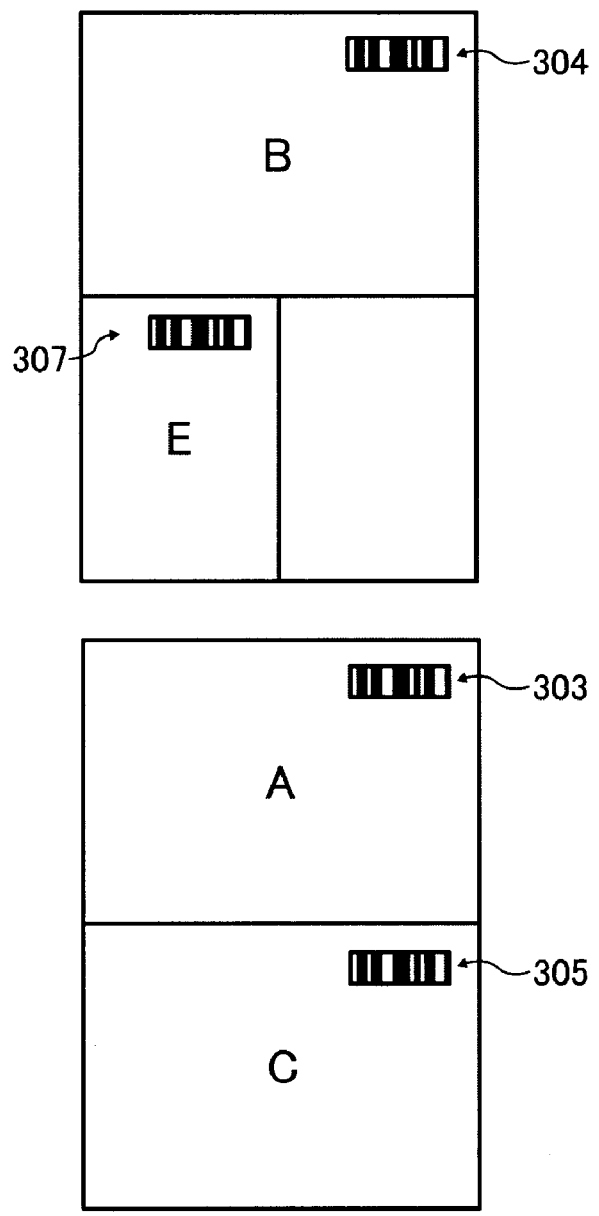

METHOD OF SELECTING IMAGE, PROGRAM AND STORAGE MEDIUM FOR THE METHOD, AND IMAGE PROCESSING APPARATUS USING THE METHOD

CROSS-REFERENCE TO RELATED APPLICATION

This application claims priority from Japanese Patent Application No. 2006-321125, filed on Nov. 29, 2006 in the Japan Patent Office, the entire contents of which are hereby incorporated by reference herein.

BACKGROUND OF THE INVENTION

1. Field of the Invention

The present disclosure relates generally to a method of selecting images, a computer program for a method of selecting images, and an image processing apparatus used for selecting images, and more particularly, to an image processing apparatus having a storage unit for storing a computer program for causing a computer to execute a method of selecting images.

2. Description of the Background Art

In general, when a person reads documents (e.g., paper document) having a large amount of information such as images or the like, he or she may want to copy some articles or the like from such documents.

In such a situation, a person may need to look through all articles in documents first, and then copy some pages required for him or her, or a person may use a scanner to scan all the articles in documents and use a preview function to display all the articles so that he or she can select articles on a display, for example. However, such method may be time consuming because a person needs to look through the articles and then select and copy them.

One technique of the background art discloses a method of marking an article on a paper document to select and copy the marked area. Such method may have some usefulness for a user to select and copy a given area on a document. Further, another background art technique discloses a method of selecting an area by putting a marking on a document, in which such marking is accomplished by changing colors of a marking device (e.g., marking pen). After marking the document, the selected area is processed using different processes depending on the colors of the markings.

However, such methods may not be so efficient for a user who wants to look up target articles from a greater number of articles because a user himself or herself may still need to check and select articles on document sheets with a marking device. Furthermore, if a number of different articles need to be distributed to a number of different persons, someone has to do a job for designating addresses and names for each article so that each article can be distributed to appropriate persons or groups. Such clerical tasks become more time consuming as the number of articles and relevant persons or groups increases.

In view of such background, a method for enhancing an efficiency of a searching process (e.g., reduced searching time) is needed.

BRIEF SUMMARY

In an aspect of the present disclosure, an image processing apparatus including a storage unit, an input unit, a reading unit, a controller, and an output unit is provided. The storage unit stores article images, embedded with mark data and loaded in the image processing apparatus. The input unit is used to input a search information element for searching an article image from the storage unit. The reading unit reads mark data of each article image stored in the storage unit. The controller controls an analysis function, a determination function, and a selection function. In the analysis function, the mark data read by the reading unit is analyzed. In the judgment function, the read mark data is compared with the search information element and checked whether the read mark data includes an information element matching the search information element. In the selection function, an article image having the read mark data matched to the search information element is selected. The output unit outputs the selected article image.

In another aspect of the present disclosure, a method of selecting an article image with an image processing apparatus loaded with article images is provided. The method includes reading, analyzing, inputting, determining, selecting, and outputting. The reading reads mark data provided to each of the article images. The analyzing analyzes the read mark data. The inputting inputs a search information element used for searching a given article image. The determining determines whether the read mark data includes an information element matching the input search information element based on a result of the analyzing. The selecting selects an article image having the read mark matching the input search information element based on a result of the judgment result. The outputting outputs the selected article image.

In another aspect of the present disclosure, a computer program product stored on a computer readable storage medium for causing a computer to execute a method of selecting an article image with an image processing apparatus loaded with article images is provided. The method includes reading, analyzing, inputting, determining, selecting, and outputting. The reading reads mark data provided to each of the article images. The analyzing analyzes the read mark data. The inputting inputs a search information element used for searching a given article image. The determining determines whether the read mark data includes an information element matching the input search information element based on a result of the analyzing. The selecting selects an article image having the read mark matching the input search information element based on a result of the judgment result. The outputting outputs the selected article image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 3A and 3B illustrate example document sheets having one article image on one sheet;

FIGS. 4A and 4B illustrate another example document sheets having a plurality of article images on one sheet;

FIG. 5 is a flow chart for illustrating a data processing of the image processing apparatus of FIG. 1;

FIGS. 7A to 7D illustrate example output article images, output by the data processing of FIGS. 6A and 6B;

FIG. 12 illustrates example output article images, output by the data processing of FIG. 11;

FIG. 14 illustrates example output article images, output by the data processing of FIG. 13;

Figure 1:
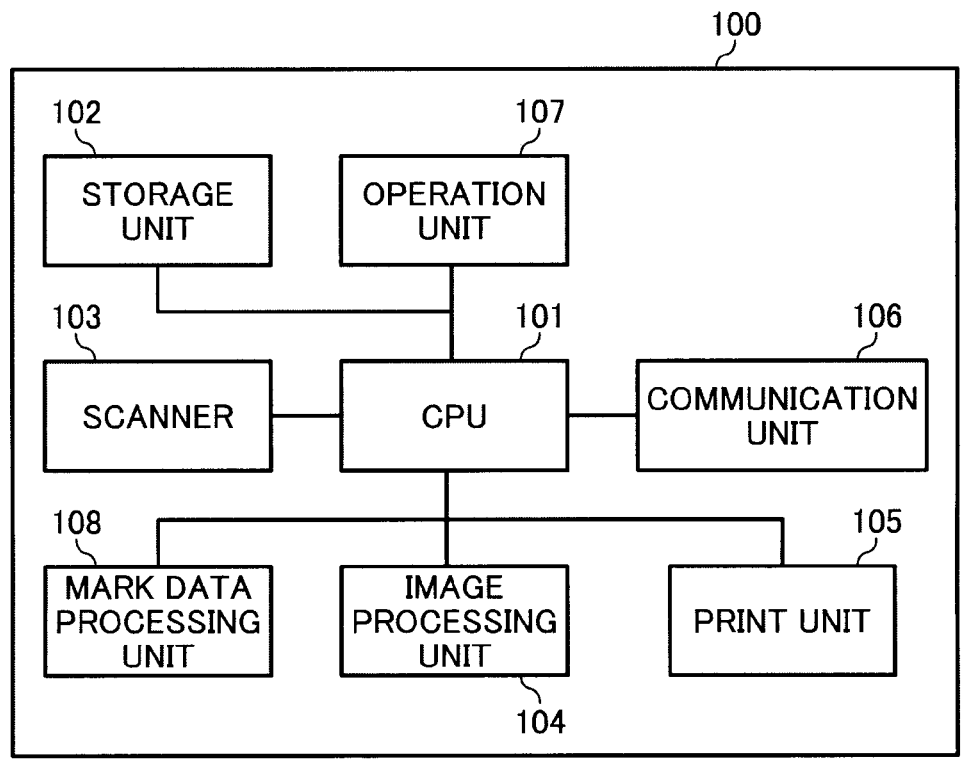
FIG. 1 is a block diagram of an image processing apparatus according to an exemplary embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Further, although in describing exemplary embodiments shown in the drawings, specific terminology is employed for the sake of clarity, the present disclosure is not limited to the specific terminology so selected and it is to be understood that each specific element includes all technical equivalents that operate in a similar manner.

Referring now to the drawings, an image processing apparatus according to an exemplary embodiment is described.

In an exemplary embodiment, the image processing apparatus may be a digitally controlled apparatus, for example, and such image processing apparatus is referred as MFP 100, hereinafter.

FIG. 1 illustrates a block diagram of the MFP 100, which includes a CPU (central processing unit) 101, a storage unit 102, a scanner 103, an image processing unit 104, a print unit 105, a communication unit 106, an operation unit 107, and a mark data processing unit 108, for example, in which the CPU 101 may control the MFP 100 as a whole.

The storage unit 102 may have a ROM (read only memory), a RAM (random access memory), a nonvolatile memory, and a HDD (hard disk drive), for example. The ROM stores computer program including a boot loader (boot program) and data such as font data or the like. The RAM is used as working memory when the CPU 101 conducts data processing. The nonvolatile memory stores information, which may be registered to the MFP 100. Such registered information may be authentication information of one or more users having an access authorization for the MFP 100, in which authentication information may include a user name and a password, for example. The HDD (hard disk drive) stores computer programs such as OS (operating system) program and application programs and document images scanned by the scanner 103. Instead of the HDD, a large capacity disk such as MO (magnet-optical) disk, CD-R (compact disc recordable), CD-RW (compact disc rewritable), DVD+R (digital versatile disk recordable), DVD+RW (digital versatile disk rewritable), DVD-R, DVD-RW, and DVD-RAM, or a non-disk type memory such as semiconductor memory can be used as storage unit.

The scanner 103 scans images on documents such as paper (hereinafter, referred as "document"). Specifically, the scanner 103 optically scans document image, and converts optical data to electronic data, which is to be used for image processing. Although the term of document or document image may be used in this disclosure, such document or document image may not be limited images printed on a sheet (e.g., paper) but may include images that can be processed by the MFP 100 such as electronic image data or digital image data, or the like, for example.

The image processing unit 104 conducts image processing such as editing to image data scanned by the scanner 103 or image data stored in the storage unit 102.

The print unit 105 outputs images, stored in the storage unit 102, on a medium such as sheet or the like.

The communication unit 106 is coupled to an external apparatus such as PC (personal computer) via a network such as LAN (local area network) or telephone line so that the MFP 100 can transmit or receive instruction or data (e.g., image data) to and from the external apparatus.

The operation unit 107 may include a keypad (or switch, button) and a display unit, for example. The keypad is used to input data or instructions to the MFP 100. The display unit, which displays information thereon, may be a LCD (liquid crystal display), a CRT (cathode ray tube), a display panel or the like, and may also be used for input data or instructions to the MFP 100, for example.

The mark data processing unit 108 reads mark data embedded to images stored in the storage unit 102 if mark data (or information) is embedded on an image.

When a power is supplied to the MFP 100, the CPU 101 reads out OS (operating system) program stored in the HDD using a boot loader stored in the ROM of the storage unit 102, and loads the OS program to the RAM to activate the OS program. Further, the CPU 101 loads other programs such as application programs stored in the HDD to the RAM, for example.

As described later, the MFP 100 may conduct several functions such as mark data analysis, matching judgment or determination, article image selection, user verification, search condition registration, article image consolidation, and priority order assignment by loading given programs to the RAM. Specifically, the CPU 101 may control such functions using such given programs and units of the MFP 100 (e.g., operation unit 107). Alternatively, although not illustrated, the above-mentioned functions may be performed by a device, an element, or the like, which may be used for a specific function.

With such configured MFP 100, image data scanned by the scanner 103 is processed by the image processing unit 104, and then a given image is output from the MFP 100. For example, the print unit 105 outputs the given image on a sheet, or the MFP 100 transmits the given image to an external apparatus using the communication unit 106 and a network or telephone line.

Figure 2:
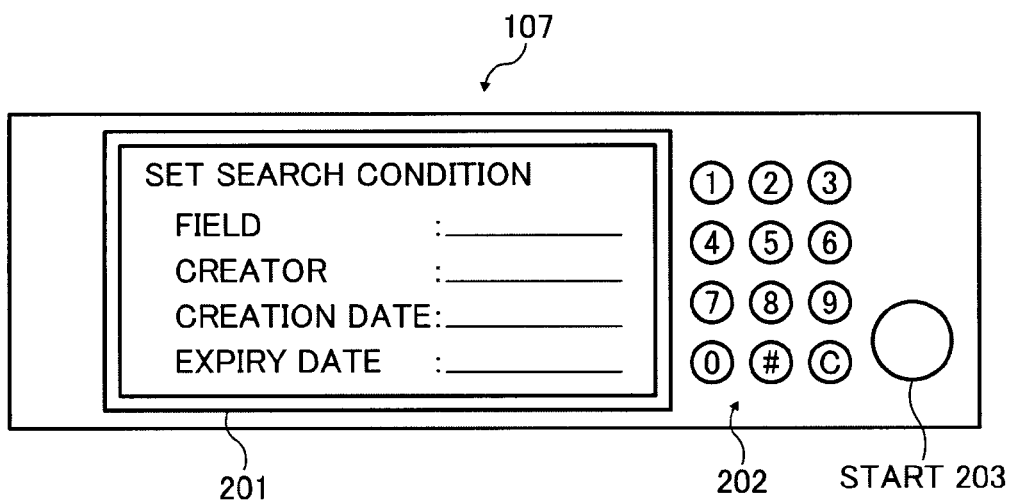
FIG. 2 illustrates an example screen shot of an operation unit used for setting a search condition.

A description is given to the operation unit 107. As illustrated in FIG. 2, the operation unit 107 may be used for setting a search condition to the MFP 100, for example. The operation unit 107 may include a touch panel 201 (e.g., LCD panel), a keypad 202, and a start key 203, for example. The touch panel 201 displays a screen for displaying operation keys, process information such as number of copying sheets and image magnification ratio, and condition messages of the MFP 100, a screen for inputting a search condition for searching articles, and a screen for inputting authentication information, for example, which will be described later.

The keypad 202 may include numeric keys and character keys, used to input information or condition to the MFP 100 such as copy condition (e.g., number of copying sheets), a search condition, authentication information, or the like. The start key 203 is used to start the functions of the MFP 100 such as copying, facsimile transmission, and document scanning by the scanner 103, for example. FIG. 2 illustrates an example screen shot of the touch panel 201 displaying a search condition screen, which is used to input a search condition to the MFP 100.

A user can input a search condition to the MFP 100 using the search condition screen or the keypad 202 (see FIG. 2), and can set such input search condition to the MFP 100 by pressing the start key 203. The MFP 100 may perform a data processing based on such search condition.

Alternatively, a user can input and set a search condition to the MFP 100 using an external apparatus such as PC (personal computer) linked to the MFP 100. Specifically, a user can input a search condition to the MFP 100 via a search condition screen displayed on a screen of the external apparatus, in which a keyboard or a pointing device (e.g., mouse) may be used to input a search condition.

Further, although not shown, a user can input and set a search condition to the MFP 100 by using a card system such as RFID (radio frequency identification) card, in which information stored in a card may be read by a card reader (not shown) and input to the MFP 100, for example.

FIGS. 3 and 4 illustrates example document sheets having article images embedded with mark data. Such article images on document sheets may be searched by the MFP 100 so that a user of the MFP 100 can obtain article images that he or she wants to view.

In this disclosure, an article image may mean any image to be processable by the MFP 100. For example, article image may be picture, character, text, or the like, or a combination of these, but not limited these.

As illustrated in FIGS. 3A, 3B, 4A, and 4B, each article on documents may be provided with mark data 301 to 307, wherein such mark data may be coded data provided for each article. Such mark data 301 to 307 may include information such as field, creator or author (e.g., person, organization), creation date (e.g., year, month, day, time), expiry date (e.g., year, month, day, time), destination/address (e.g., name of person or organization) or the like, but not limited these. Because such mark data 301 to 307 may identify an attribution of each article, the MFP 100 can effectively and efficiently perform data retrieval and distribution as described later.

In FIGS. 3A and 3B, one document sheet or page may include one article, and each one of the articles may be provided with the mark data 301 and 302, for example. In FIGS. 4A and 4B, one document sheet or page may include a plurality of articles, and each one of the articles may be provided with the mark data 303 to 307, for example.

The mark data 301 to 307 may be bar code as illustrated in FIGS. 3A, 3B, 4A, and 4B, an electronic watermark (not shown) embedded on image, or the like for example. Such mark data 301 to 307 may be provided to each article with any known methods. For example, when a document creator or author (e.g., publishing company) creates documents, the document creator or author may include category information (e.g., economy, finance) to each article using coded data such as bar code or the like, but not limited theses. Such mark data 301 to 307 may be provided to each article to facilitate a searching process as described later.

A description is now given to one example data process performed by the MFP 100 with reference to FIG. 5, which is a flow chart for illustrating a data processing of the MFP 100, in which documents shown in FIGS. 3A and 3B are used as original document to be searched by the MFP 100.

First, a user inputs a search condition to a search condition screen displayed on the operation unit 107, and registers such search condition to the MFP 100.

The search condition may include information or data such as field information, creator or author information, creation date information, expiry date information, destination/address information, or the like, for example.

Although FIG. 2 shows one example search condition screen, which can input a plurality of information element, a number of such information element included in one search condition may be set to any value. For example, one search condition may be composed of one information element, or may be composed of a plurality of information elements, wherein a user of the MFP 100 may select the number of information element for one search condition.

When the start key 203 is pressed after setting a search condition, the CPU 101 starts a process shown in FIG. 5, which is conducted using document sheets or pages including only one article on one sheet or page (see in FIGS. 3A and 3B).

In step S1, the CPU 101 instructs the scanner 103 to scan document image, which may be set on a contact glass of the scanner 103. If the scanner 103 is provided with an ADF (automatic document feeder), the ADF is used to automatically feed documents to the contact glass of the scanner 103 one by one for an image scanning operation.

In step S2, a page number is assigned to each image scanned by the scanner 103, and the scanned document image is stored in the storage unit 102 (e.g., HDD). Such page number may be used to store scanned document images in a given order in the storage unit 102, for example.

In step S3, the CPU 101 checks whether a scanning operation is still required. If the start key 203 is pressed in step S3, it is determined that a scanning operation is still required (Yes in step S3), and the process goes back to step S1. If it is determined that a scanning operation is not required (No in step S3) with an instruction from the operation unit 107, for example, the process goes to step S4. Such process may be conducted when the scanner 103 is not provided with an ADF.

On one hand, if the scanner 103 is provided with an ADF, step S3 may be conducted as follows. Specifically, the ADF may be provided with a sensor (not illustrated) to check whether a document sheet is placed on the document tray of the ADF. If the sensor detects a document sheet, it is determined that document sheet is still placed for scanning operation (Yes in step S3), and the process goes back to step S1. Accordingly, after all document sheets are automatically fed to the contact glass and scanned by the scanner 103, and each of the scanned images is assigned with a page number and stored in the storage unit 102, the sensor detects that no document sheets is left on the document tray of the ADF. When the sensor detects no document sheets on the ADF, it is determined that a scanning operation has completed (No in step S3), and the process goes to step S4.

In step S4, an article image stored in the storage unit 102 is retrieved. If a plurality of article images is stored in the storage unit 102, an article image having a first page number may be retrieved at first, for example.

In step S5, the mark data processing unit 108 reads mark data embedded to the retrieved image, retrieved in step S4. The mark data processing unit 108 may be an image processing circuit, which may detect or read information of article images stored in the storage unit 102.

In step S6, the read mark data is analyzed.

In step S7, it is determined whether the read mark data includes information that matches a search condition registered to the MFP 100 based on an analysis in step S6. For example, because each article image may be embedded with specific mark data as above mentioned (see mark data 301 to 307 in FIGS. 3 and 4), the read mark data is checked with a registered search condition whether the read mark data includes information that matches the search condition. If it is determined that the read mark data includes information that matches a search condition registered to the MFP 100 (Yes in step S7), the process goes to step S8.

In step S8, the CPU 101 selects and outputs an image data (e.g., article image) embedded with the read mark data matched to the registered search condition, and the process goes to step S9.

Specifically, the MFP 100 may output the selected article image as print image on a sheet using the print unit 105, or may transmit the selected article image to an external apparatus, linked via a network or telephone line, using the communication unit 106.

If an image data (e.g., article image) retrieved from the storage unit 102 does not include mark data, the mark data processing unit 108 cannot conduct the above-described process for reading mark data. Accordingly, in exemplary embodiments described in this disclosure, article images having no mark data may not be selected and output by the MFP 100.

After step S8 or "No" in step S7, the process goes to step S9, and it is checked whether the storage unit 102 still stores images, not checked with the input search condition. If it is determined that the storage unit 102 still stores an image having a next page number (Yes in step S9), the process goes to step S4, and repeats the subsequent steps. Accordingly, until all article images stored in the storage unit 102 are checked with the input search condition, article images are retrieved one by one, and the steps S4 to S9 are repeatedly performed.

When all article images stored in the storage unit 102 are retrieved, and checked with a given search condition, and article images matched to the given search condition are output from the MFP 100, it is determined that all article images stored in the storage unit 102 are checked with the process shown in FIG. 5, and the process ends (No in step S9).

With such process show in FIG. 5, one or more article images are output and distributed to relevant one or more persons or groups.

In this disclosure, article images stored in the storage unit 102 may be maintained as an image database so that such article images can be searched with any given search condition at any time once the such image database is prepared in the MFP 100, or article images stored in the storage unit 102 may be changed or deleted at any time.

Although only one search condition is set to the MFP 100 in the above-described process, a plurality of search conditions can be registered to the MFP 100. In such a case, the above mentioned read mark data may be checked with the registered plurality of search conditions in step S7 of FIG. 5, and if the read mark data matches at least one of the plurality of search conditions, the process goes to step S8.

In the process shown in FIG. 5, the MFP 100 retrieves an article image stored in the storage unit 102, wherein such article image may be loaded in the MFP 100 by scanning images with the scanner 103, for example. If the article image is embedded with mark data, the mark data is read and analyzed. Based on such analysis, it is determined whether the mark data includes information that matches a search condition registered to the MFP 100. If it is determined that the mark data includes information that matches such registered search condition, an article image embedded with such mark data is selected and output as an output image by the print unit 105 or the communication unit 106.

Accordingly, by embedding mark data to each one of articles on document sheets scanned by the scanner 103, a user may not need to look through all articles on document sheets when he or she wants to retrieve one or more article images from a large number of article images, by which he or she can search articles with reduced searching time, and can reduce an amount of sheets to be printed with article images, which may save a sheet consumption.

Further, the above-described process may have following (1) to (5) aspects. (1) A user can input and register a search condition to the MFP 100 by using the operation unit 107 or an external apparatus, which may be a relatively easy process for a user. (2) When mark data includes "field" information of an article, the MFP 100 can select an article image related to "field" information required by a user, and output such article image using the print unit 105 or the communication unit 106. (3) When mark data includes "creator or author name" information of an article, the MFP 100 can select an article image related to "creator or author name" information required by a user, and output an article image using the print unit 105 or the communication unit 106. (4) When mark data includes "creation date" information of an article, the MFP 100 can select an article image related to "creation date" information required by a user, and output an article image using the print unit 105 or the communication unit 106. (5) When mark data includes "expiry date" information of an article, the MFP 100 can select an article image related to "expiry date" information required by a user, and output an article image using the print unit 105 or the communication unit 106. For example, if "expiry date" information is "after 2007/10/10," the MFP 100 may output an article image having an expiry data "after 2007/10/10" but may not output an article image having an expiry data of "before 2007/10/10." Furthermore, a creator or author (e.g., publisher or the like) can designate a viewer of articles by setting a name of "group" or "person" as "destination" information in a mark data of an article image. If such "destination" information is included in mark data of a given article image, the designated viewer such as "group" or "person" may be accessed to the given article image. The designated viewer may be one or more viewers.

A description is now given to another example process performed with the MFP 100 with reference to FIGS. 6 and 7. FIG. 6 is a flow chart for illustrating another data processing of the MFP 100, in which documents including articles shown in FIG. 4A and FIG. 4B are used as original documents to be searched by the MFP 100. FIGS. 7A to 7D illustrate example output article images, output by the process of FIG. 6.

Figure 6A:
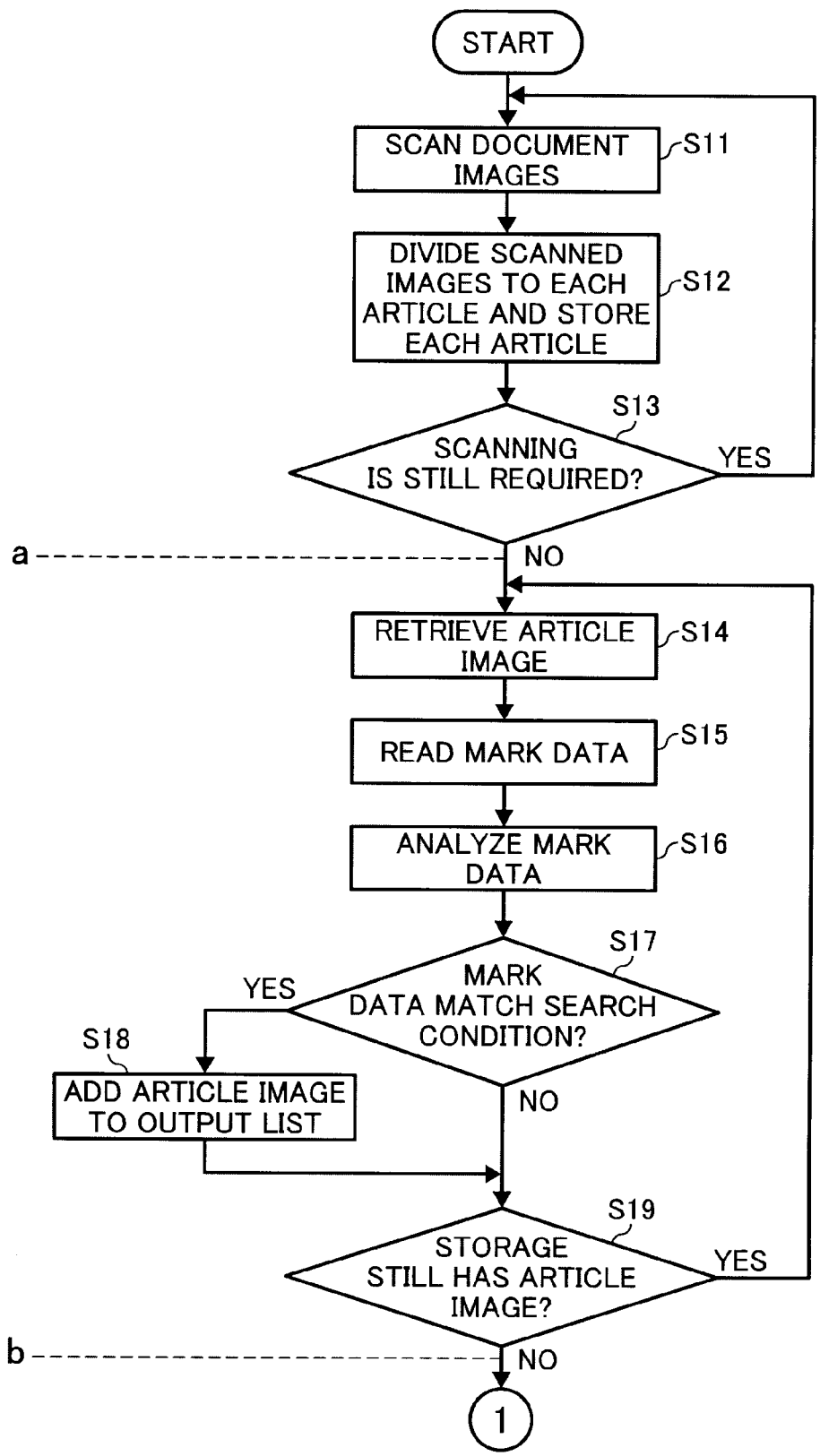
FIGS. 6A and 6B are a flow chart for illustrating another data processing of the image processing apparatus of FIG. 1.
Figure 6B:
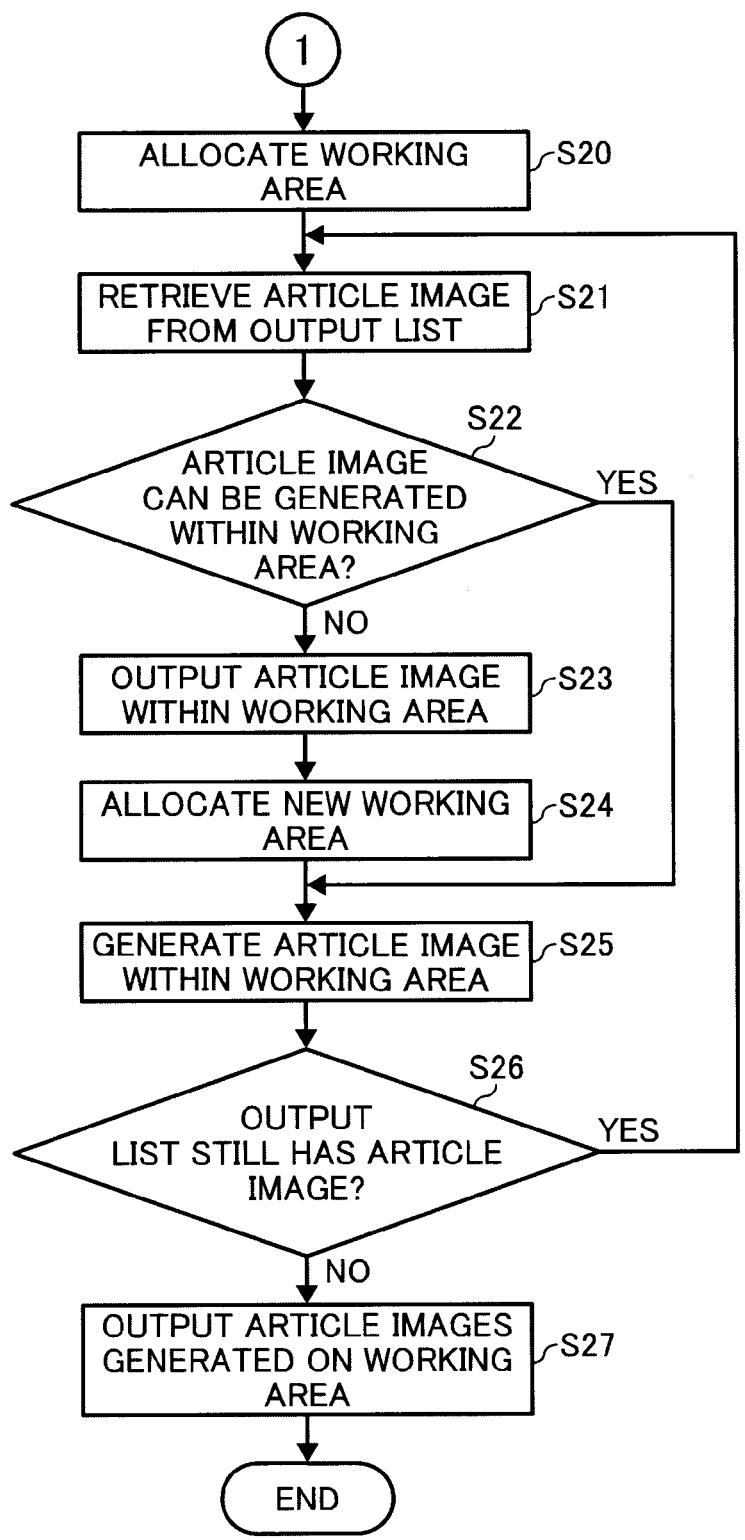

When a user inputs and registers a search condition such as field, creator or author, creation date, expiry date, and destination/address through the search condition screen shown in FIG. 2, and presses the start key 203, the CPU 101 may start a process shown in FIGS. 6A and 6B. The process shown in FIGS. 6A and 6B is used when one document sheet or page includes a plurality of articles as shown in FIGS. 4A and 4B.

In step S11, the CPU 101 instructs the scanner 103 to scan document images.

In step S12, the scanned images are divided into each article image, and an identification number may be assigned to the each article image and the each article image is stored in the storage unit 102 (e.g., HDD). The identification number may be used to store articles images in a given order in the storage unit 102, for example.

In step S13, it is determined whether a scanning operation is still required. If it is determined that a scanning operation is still required (Yes in step S13), the process goes back to step S11. If it is determined that a scanning operation is not required (No in step S13), the process goes to step S14.

In step S14, article images stored in the storage unit 102 are retrieved. If a plurality of article images is stored in the storage unit 102, an article image having a first identification number may be retrieved at first, for example.

In step S15, the mark data processing unit 108 reads mark data embedded to the retrieved article image.

In step S16, the read mark data is analyzed.

In step S17, it is determined whether the read mark data includes information that matches a search condition registered to the MFP 100 based on an analysis in step S16.

If it is determined that the read mark data includes information that matches a search condition registered to the MFP 100 (Yes in step S17), the process goes to step S18.

In step S18, the CPU 101 selects an article image embedded with the read mark data matched to the registered search condition and adds the selected article image to an output list, and the process goes to step S19. The output list may include a plurality of article image data to be output by the MFP 100.

If it is determined that the read mark data does not include information that matches a search condition registered to the MFP 100, an article image retrieved from the storage unit 102 is not selected (No in Step S17), and the process goes to step S19.

After step S18 or "No" in step S17, the process goes to step S19, and it is determined whether the storage unit 102 still has article images not checked by the input search condition. If it is determined that the storage unit 102 still stores an article image having a next identification number not checked by the search condition (Yes in step S19), the process goes to step S14, and repeats the subsequent steps.

When all article images stored in the storage unit 102 checked by the search condition and relevant article images, matched to the search condition, are added to the output list by steps S14 to S18, the CPU 101 determines that all article images stored in the storage unit 102 are checked by the search condition (No in step S19), and the process goes to step S20.

In step S20, a given working memory area is allocated in the storage unit 102. Specifically, such working memory area (or working area) may be a memory space allocated on a memory such as RAM. Such working memory area may be allocated in a memory while maintaining the above-mentioned article images in the same memory or such working memory area may be allocated in a memory by deleting the above-mentioned article images from the memory, for example.

In step S21, an article image having a first identification number in the output list is retrieved. Because the output list includes article images selected by the process shown in FIG. 6A, the first identification number of article image, added in the output list, may be the smallest identification number compared to other article images, added in the output list. For example, if article images having identification numbers 3, 7, and 11 are added in the output list, the article image having identification number 3 may be retrieved at first in step S21.

In step S22, the CPU 101 determines whether the retrieved article image can be generated within the given working memory area. If the CPU 101 determines that the retrieved article image can be generated within the given working memory area (Yes in step S22), the process goes to step S25.

In step S25, the retrieved article image is generated within the given working memory area. In an exemplary embodiment, such given working memory area may have any memory size. For example, such given working memory area may be corresponded to one page, used for outputting article images, such as A4 sized sheet, but not limited these.

In step S26, the CPU 101 checks whether the output list still includes an article image. If the CPU 101 determines that the output list still includes an article image having a next identification number, the process goes back to step S21 and retrieves an article image having the next identification number from the output list. Then, in step S22, the CPU 101 determines whether the retrieved article image can be added and generated within the given working memory area.

If the CPU 101 determines that the retrieved article image can be added and generated within the given working memory area (Yes in step S22), the process goes to step S25, and the retrieved article image is added and generated within the given working memory area.

On the other hand, if the CPU 101 determines that the retrieved article image cannot be added within the given working memory area (No in step S22), the process goes to step S23.

In an exemplary embodiment, the given working memory area may have a given maximum memory size. Therefore, depending on data size of retrieved article images, a number of article images that can be generated within one given working memory area may vary. For example, if data size of article images is relatively small, a number of article images that can be generated within one given working memory area may become greater, and if data size of article images is relatively great, a number of article images that can be generated within one given working memory area may become smaller. Therefore, if data size of article images exceeds or overflows the size of one given working memory area, such article images may not be generated in the one given working memory area.

In step S23, one or more article images, which can be generated within the given working memory area, are output by the MFP 100. Specifically, the MFP 100 may output an article image as print image on a sheet using the print unit 105, or transmit article image data to an external apparatus, linked via a network or telephone line, using the communication unit 106.

After step S23, a new working memory area is allocated on the storage unit 102 in step S24.

In this disclosure, a new working memory area may be allocated as follows. In one case, a working memory area, which is already used for generating article images and then reset to an initial condition by outputting article images from the working memory, may be used again as new working memory. In another case, a plurality of working memory areas may be allocated and one working memory area may be used as the above described given working memory area and another working memory areas may be used as a new working memory area. For example, a first working memory area may store article images and a second working memory area may also store other article images simultaneously, by which even if some article images cannot be stored in the first working memory area, such article images can be stored in the second working memory area, for example.

In step S25, an article image having the next identification number, which cannot be added within the above-mentioned one given working memory area (No in step S22), is generated on the new working memory area.

In step S26, the CPU 101 checks whether the output list still includes an article image. If it is determined that the output list still includes an article image having another next identification number, the process goes back to step S21, and repeats the subsequent steps. Accordingly, until all article images in the output list are retrieved from the output list, steps S21 to S26 are repeatedly performed.

When it is determined that no article images is included in the output list (No in step S26), the MFP 100 outputs article images, generated on one or more working memory areas, in step S27, and the process ends.

Although only one search condition is set to the MFP 100 in the above-described process of FIG. 6, a plurality of search conditions can be registered to the MFP 100. In such a case, mark data is checked with the registered plurality of search conditions in step S17 of FIG. 6A, and if the mark data matches at least one of the plurality of search conditions, the process goes to step S18.

For example, the MFP 100 may output article images as shown in FIGS. 7A to 7D when a given search condition is set when searching articles from two documents shown in FIGS. 4A and 4B.

If a search condition including a field information "automobile" is registered, two article images of "A" and "C" may be consolidated and output on one page as shown in FIG. 7A. In this disclosure, consolidation is a process for joining at least two article images on one sheet or page when to output article images by the MFP 100.

In another case, if a search condition including a creator or author information "Mr. AX" is registered, two article images of "A" and "E" may be consolidated and output on one page as shown in FIG. 7B.

In another case, if a search condition including a creation date/time information "2006/06/10 to 2006/07/31" is registered, three article images of "A," "D," and "E" may be consolidated and output on one page as shown in FIG. 7C.

In another case, if a search condition including expiry date information "after 2006/07/31" is registered, two article images of "A" and "B" may be consolidated and output on one page and one article image of "E" is output on another one page as shown in FIG. 7D.

In the process shown in FIGS. 6A and 6B, after the scanner 103 scans images and the scanned images are divided into each one of article images, each article image stored in the storage unit 102. The MFP 100 retrieves each article image stored in the storage unit 102. If such article images are embedded with mark data, the mark data is read and analyzed sequentially. Based on such analysis, it is checked whether the mark data includes information that matches a search condition registered to the MFP 100. If it is determined that the mark data includes information that matches such search condition, an article image embedded with such mark data is selected and output as an output image by the print unit 105 or the communication unit 106.

Accordingly, by embedding mark data including specific information to each article on documents scanned by the scanner 103, a user may not need to look through all articles on documents when he or she wants to obtain or retrieve one or more article images from a large number of articles. Therefore, a user can search articles with reduced searching time.

Further, the print unit 105 or the communication unit 106 can output article images by consolidating article images on one sheet or page, for example. Such one sheet or page may include article images, which are retrieved from different document sheets or pages. Therefore, a user can save a number of sheets or pages for outputting article images, which may lead to a saving of paper consumption or memory space for outputting images. Further, the above-described (1) to (5) aspects described for the process shown in FIG. 5 are similarly obtained for the process shown in FIGS. 6A and 6B.

Figure 8:
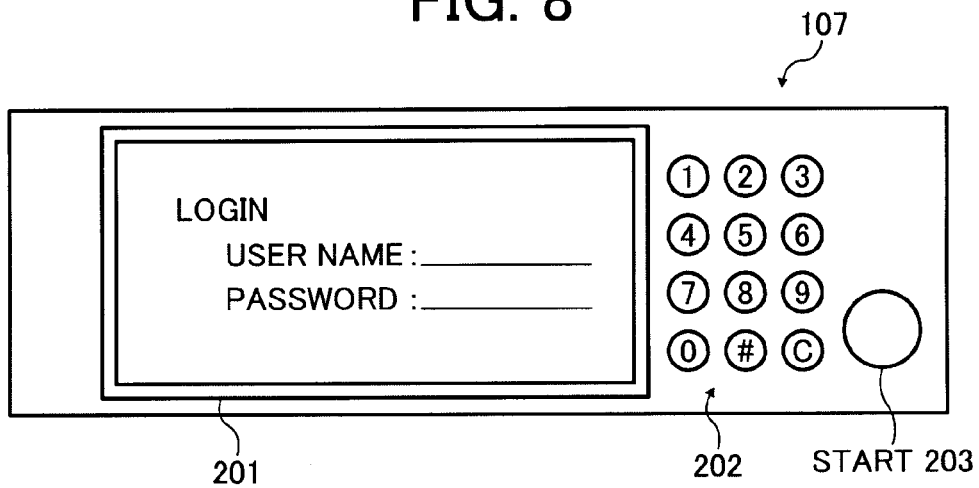
FIG. 8 illustrates an example screen shot of an operation unit used for setting a login condition.
Figure 9:
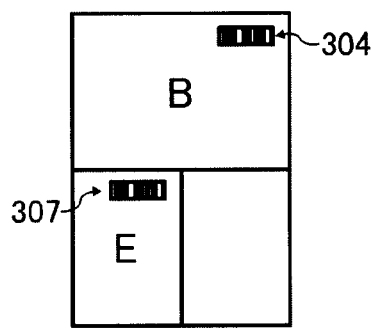
FIG. 9 illustrates an example output article image, output using the login condition of FIG. 8.

A description is now given to a login process with reference to FIG. 8 illustrating the operation unit 107 having a login screen. FIG. 9 illustrates an example output article image, output by a data processing of the MFP 100, in which a login process is included.

When a user touches any key on the operation unit 107, the CPU 101 may instruct the operation unit 107 to display a login screen (or user authentication screen) shown in FIG. 8. Such login screen requests a user to input user authentication information such as a user name and a password, for example. When a user name and a password is input to the login screen using the operation unit 107, a user authentication request, which requests a user verification process for the input user name and password, is issued and transmitted to the CPU 101.

When the CPU 101 receives such user authentication request, the CPU 101 performs a user verification process using user information such as user name and password included in the user authentication request. Specifically, the CPU 101 checks whether the user information included in such user authentication request is registered or stored in the storage unit 102.

If the CPU 101 confirms that the user information included in the received user authentication request is found in the storage unit 102, a user verification process is successfully conducted. Accordingly, a user, who inputs authentication information, is verified as authentic user, by which the MFP 100 is set to a login condition, and the user can access the MFP 100. At this time, a user name used for user verification process may be set as destination/address information of a search condition, which is used when to output an article image by the MFP 100.

If the CPU 101 cannot find the user information included in the received user authentication request in the storage unit 102, a user verification process is failed, by which a user cannot access the MFP 100.

After such login process, the CPU 101 starts a data processing shown in FIG. 5 or 6 when the start key 203 is pressed.

When the scanner 103 scans a plurality of document images (see FIGS. 3A and 3B, FIGS. 4A and 4B) in step S1 of FIG. 5 or step S11 of FIG. 6, the MFP 100 may output an article image for a given destination/address related to a given user in step S8 of FIG. 5 or step S27 of FIG. 6. If the above-described login process is conducted, a user name used for the login process is set as destination/address information of a search condition.

Accordingly, if two document sheets shown in FIGS. 4A and 4B are used for searching article images, and a user having a name of "Mr. BX" conducts the above-described login process, the MFP 100 may consolidate and output two article images of "B" and "E" in one sheet or page using a user name of "Mr. BX" as destination/address information as shown in FIG. 9.

Alternatively, a login screen shown in FIG. 8 can be displayed on an external apparatus such as PC (personal computer), linked to the MFP 100, so that a user name and a password can be input to the MFP 100 from the external apparatus.

Further, although user authentication information may be input to the MFP 100 by using a user name and a password in FIG. 8, such user authentication can be input to the MFP 100 by using other methods such as identification card, fingerprint scan, retina scan, biometrics identification, or the like, for example. The above-described login process may be used with any exemplary embodiments described in this disclosure.

Further, although only destination/address information (i.e., user name) is used as search condition in the data processing using a login process, other information such as field, creator or author, creation date/time, or expiry date can be similarly set in a search condition. Further, a search condition can be configured with at least one of information such as field, creator or author, creation date/time, expiry date, and destination/address or a combination of any information (e.g., combination of two information, combination of three information).

When the above-described login process is included in the process shown in FIG. 5 or FIGS. 6A and 6B, a user authentication information is input to the MFP 100 using the operation unit 107 or an external apparatus, and it is checked whether such user authentication information is registered in the MFP 100 in advance. If the user authentication information is authentic, the user verification process is succeeded. At this time, the user name included in the user authentication information may be automatically set as information for a search condition.

Because the user name included in the user authentication information can be set as information for a search condition automatically when the user logins the MFP 100, the user may not need to input the user name as a search condition. Accordingly, a user can obtain one or more article images, output by the print unit 105 or the communication unit 106, with a simpler process.

Figure 10:
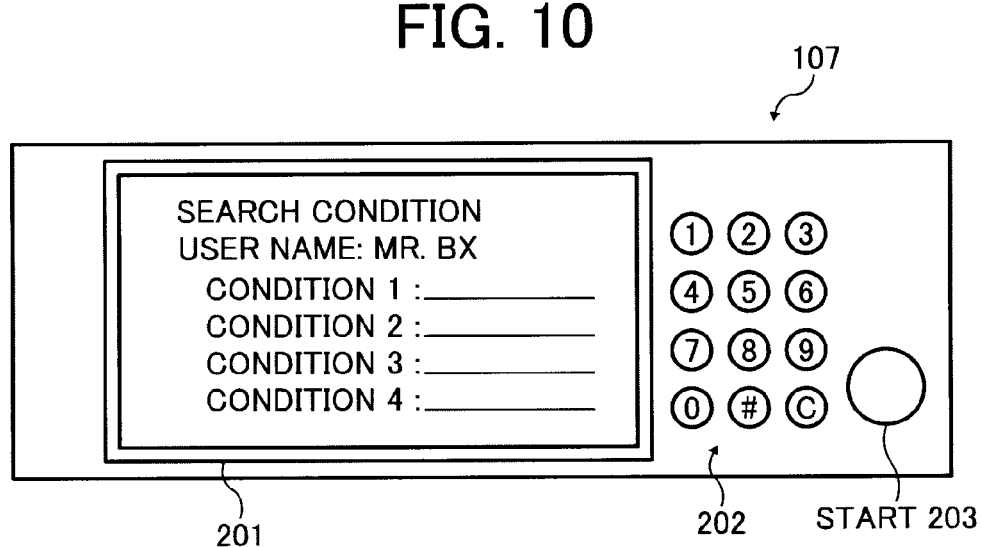
FIG. 10 illustrates an example screen shot of an operation unit used for setting a plurality of search conditions.

A description is now given to another search condition screen with reference to FIG. 10, which illustrates the operation unit 107 displaying another search condition screen. When a user verification process is conducted as above described and the user logins the MFP 100 (see FIG. 8), the CPU 101 may instruct the operation unit 107 to display the search condition screen shown in FIG. 10, for example.

In exemplary embodiments, a user of the MFP 100 may set one or more search conditions including information (e.g., field) for searching article images as above described.

When setting a plurality of search conditions, a user may use the search condition screen shown in FIG. 10, for example, in which a user name may be set as a default condition. For example, when Mr. BX logins the MFP 100, the name of the Mr. BX may be set as one information for search condition as shown in FIG. 10.

Further, a user can input, register, and store user specific information to be used for searching article images, linked to the user name, to the storage unit 102 (e.g., nonvolatile memory) of the MFP 100 by using the search condition screen shown in FIG. 10, for example.

If such search condition for searching article images is registered to the MFP 100 at some point of time, such registered search condition linked to the user name may be read from the storage unit 102 when each time the same user logins the MFP 100 with the above described user verification process, and such search condition may be used for selecting article images to be output by the MFP 100. Accordingly, a user can search article images with a simpler process. Furthermore, a user can change such registered search condition at any time.

When the above-described login process is conducted, the CPU 101 may instruct the operation unit 107 to display one or more search conditions linked to a user name, registered in the storage unit 102, on the search condition screen. When the start key 203 is pressed, such registered search conditions is displayed on the search condition screen and set to the MFP 100, and the process shown in FIG. 5 or FIG. 6 is started to select and output an article image.

Further, when a user changes at least one information of search conditions on the search condition screen, such change can be registered and stored in the storage unit 102. Such changed search conditions are set to the MFP 100 by pressing the start key 203, and the process shown in FIG. 5 or FIG. 6 is started to select and output an article image with such changed search conditions.

Alternatively, a user can input and set one or more search conditions to the MFP 100 using an external apparatus such as PC (personal computer) linked to the MFP 100. Specifically, a user can input one or more search conditions using a search condition screen, similar to the search condition screen of FIG. 10, displayed on a screen of the external apparatus, and register one or more search conditions to the MFP 100.

When the above-described login process is included in the process shown in FIG. 5 or FIGS. 6A and 6B, user authentication information is input to the MFP 100 using the operation unit 107 or an external apparatus, and it is checked whether such user authentication information is registered in the MFP 100. If the user authentication information is authentic, the user verification process is succeeded. At this time, the user name included in the user authentication information may be automatically set as information for a search condition. Because the user name included in the user authentication information can be set as information for a search condition automatically when the user logins the MFP 100, the user may not need to input the user name when to search article images.

Further, because a user can input and register at least one search condition to the MFP 100 (see FIG. 10) and such registered search condition can be read from the storage unit 102 when a user inputs user authentication information for user verification process to the MFP 100, the user may not need to input a same search condition every time the user logins the MFP 100.

Accordingly, a user can obtain one or more article images, which is output by the print unit 105 or the communication unit 106, with a simpler process.

Figure 11:
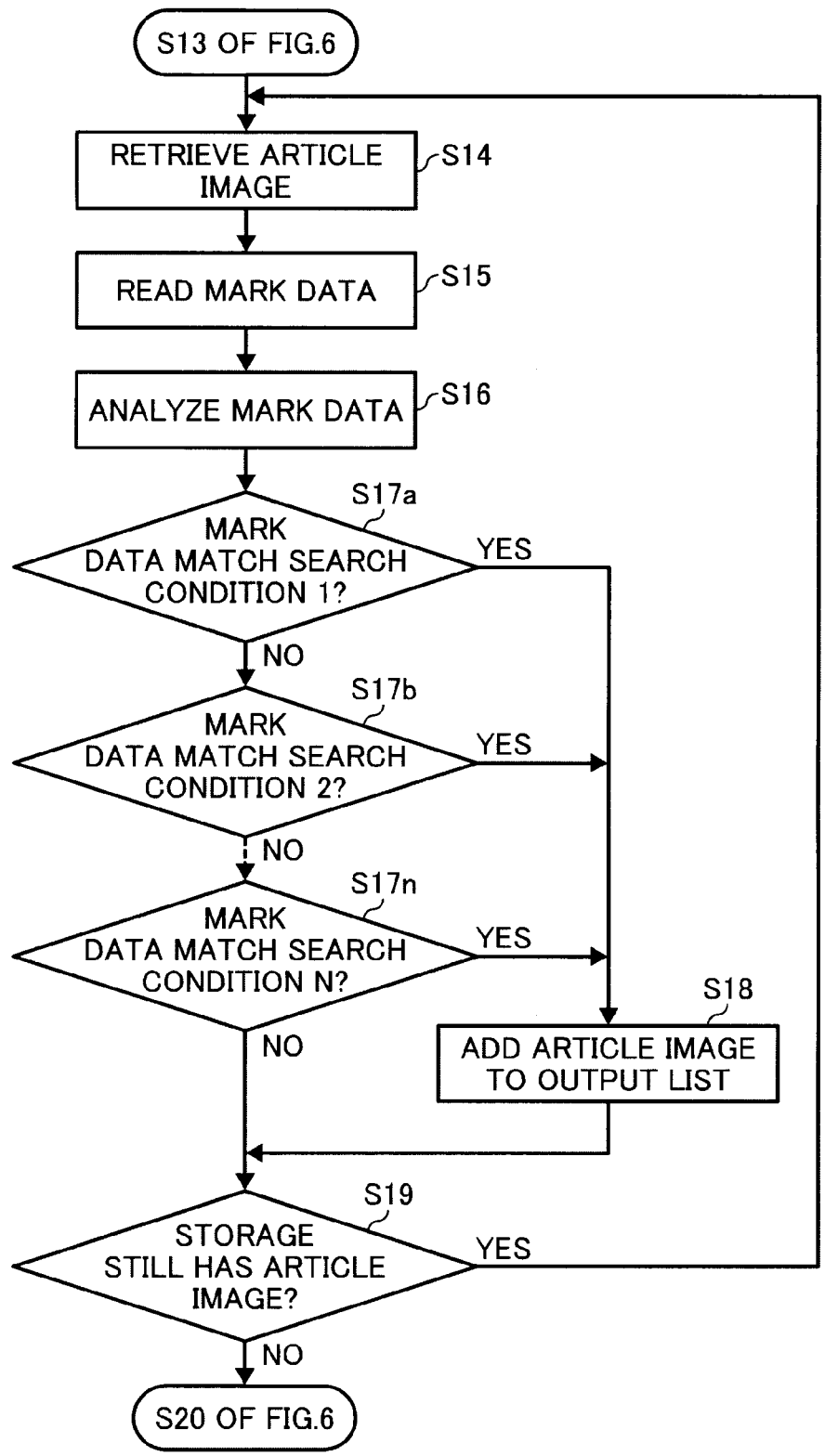
FIG. 11 is a flow chart for illustrating another data processing of the image processing apparatus of FIG. 1.

FIG. 11 is another flow chart for illustrating another data processing for the MFP 100. More specifically, FIG. 11 shows another processing steps, corresponding to steps S14 to S19 of FIG. 6A (see "a-b" section in FIG. 6A). FIG. 12 is another example output article images, output by the process of FIG. 11.

In FIG. 11, after registering a plurality of search conditions to the MFP 100 as similar to above described exemplary embodiments, the CPU 101 conducts steps S11 to S15 shown in FIG. 6 to select an article image matched to each of the search conditions, and analyzes mark data in step S16. In the process shown in FIG. 11, step S17 may be modified as below compared to the process shown in FIGS. 6A and 6B.

As shown in FIG. 11, step S17 may be modified to include a series of steps S17a, S17b, and S17n, wherein the suffix letter "a, b, . . . n" may indicate that a plurality of search conditions are set to the MFP 100. The CPU 101 checks whether mark data, embedded to article images, matches to any one of the plurality of search conditions using an analysis result obtained in step S16.

If mark data is matched to any one of the search conditions (Yes in steps S17a, S17b, and S17n), the process goes to step S18. In step S18, the CPU 101 selects an article image having the mark data and adds the article image to an output list as to-be-output image. After step S18, the process goes to steps S19 to S27 of FIGS. 6A and 6B.

For example, the MFP 100 may output article images shown in FIG. 12 when search conditions are set for searching article images from two documents shown in FIGS. 4A and 4B.

As shown in FIG. 12, if a search condition including field information "automobile" or another search condition including expiry date information "after 2006/09/01" are registered, two article images of "A" and "B" are consolidated and output on one page by using the search condition including field information "automobile," and two article images of "C" and "E" are consolidated and output on another page by using the search condition including expiry date information "after 2006/09/01." Accordingly, article images matched to the field information "automobile" are output on one sheet or page, and article images matched to the expiry date information "after 2006/09/01" are output on another sheet or page, for example (see FIG. 12).

When a plurality of search conditions is used for searching article images, such search conditions may be combined each other using a logical relationship "OR" or "AND," for example.

In case of "OR" relationship, if any one of registered search conditions is matched to information included in mark data, one or more article images having the such mark data are selected and output. For example, if field information "automobile" and expiry date information "after 2006/09/01" are used as search conditions, article images embedded with mark data having field information "automobile" is output, and article images embedded with mark data having expiry date information "after 2006/09/01" is output.

In case of "AND" relationship, if every registered search conditions are matched to information included in a mark data, article images having the such mark data is selected and output. For example, if field information "automobile" and expiry date information "after 2006/09/01" are used as search conditions, one or more article images embedded with mark data having field information "automobile" and expiry date information "after 2006/09/01" are output. Such logical relationship "OR" or "AND" may be used alone or combined depending on a needs of searching operation. The process shown in FIG. 11 may be conducted similarly as the processes shown in FIG. 5 or FIG. 6A/6B, and may have similar effects.

Figure 13:
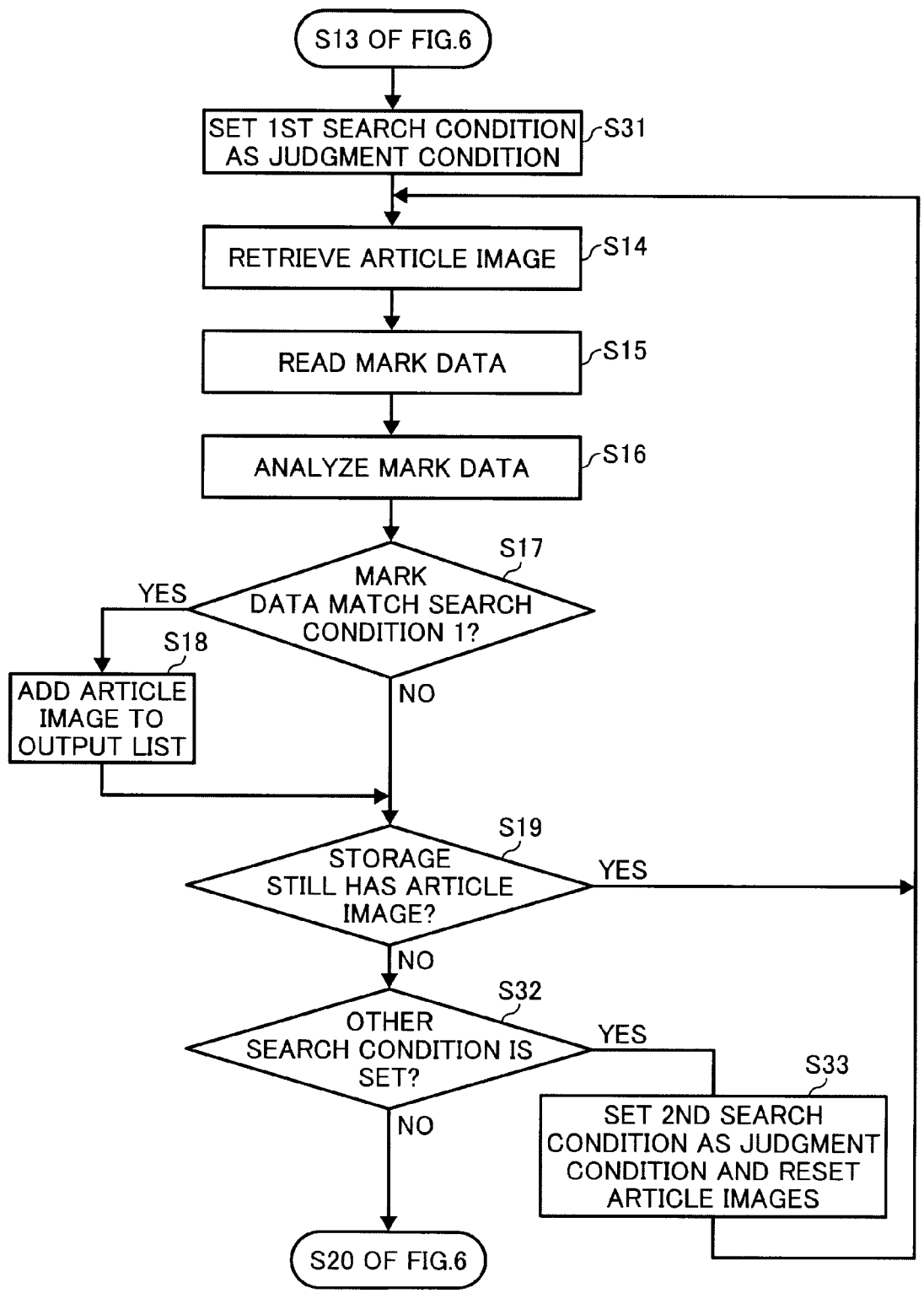
FIG. 13 is a flow chart for illustrating another data processing of the image processing apparatus of FIG. 1.

FIG. 13 is another flow chart for illustrating another data processing for the MFP 100. More specifically, FIG. 13 shows another processing steps, corresponding to steps S14 to S19 of FIG. 6A (see "a-b" section in FIG. 6A). FIG. 14 is another example output article images, output by the process of FIG. 13.

In the process of FIG. 13, when registering a plurality of search conditions to the MFP 100, the CPU 101 may set a priority order for the plurality of search conditions. A user may set such priority order with the operation unit 107 or an external apparatus, for example.

Hereinafter, two search conditions of a first search condition (or 1st search condition) having a highest priority and a second search condition (or 2nd search condition) having a second highest priority are used for describing the process of FIG. 13. It should be noted that the number of search conditions can be set to any value depending on a needs of searching operation.

After conducting steps S11 to S13 of FIG. 6, the process goes to step S31 in the process of FIG. 13.

In step S31, the 1st search condition having a highest priority is set to the MFP 100 as a judgment (or determination) condition, which is to be used in a judgment step S17, and the process goes to step S14.

In step S14, article images stored in the storage unit 102 are retrieved. If a plurality of article images is stored in the storage unit 102, an article image having a first identification number is retrieved at first, for example. In exemplary embodiments, each article image may have an identification number, which may be used to store article images in a given order in the storage unit 102.

In step S15, the mark data processing unit 108 reads mark data embedded to the retrieved article image.

In step S16, the read mark data is analyzed.

In step S17, it is determined whether the read mark data includes information that matches the judgment condition set in step S31 based on an analysis in step S16. If it is determined that the read mark data includes information matching the judgment condition (Yes in step S17), the process goes to step S18.

In step S18, the CPU 101 selects an article image embedded with the read mark data matched to the judgment condition and adds the selected article image data to an output list, and the process goes to step S19. The output list includes a plurality of article image data to be output by the MFP 100.

On one hand, if it is determined that the read mark data does not include information that matches the judgment condition set to the MFP 100, an article image retrieved from the storage unit 102 is not selected (No in Step S17), and the process goes to step S19.

After step S18 or "No" in step S17, in step S19, it is determined whether the storage unit 102 still stores article images, not checked with the judgment condition. If it is determined that the storage unit 102 still stores an article image having a next identification number (Yes in step S19) not checked with the judgment condition, the process goes to step S14, and the process repeats steps S14 to S19.

When all article images stored in the storage unit 102 are checked by steps S14 to S19 and relevant article images, matched to the input search condition, are added to the output list, the CPU 101 determines that all article images stored in the storage unit 102 are checked with the judgment condition (No in step S19), and the process goes to step S32.

In step S32, the CPU 101 checks whether the 2nd search condition is set to the MFP 100. If the CPU 101 determines that the 2nd search condition is set to the MFP 100 (Yes in step S32), the process goes to step S33. In other words, the 2nd search condition is set to the MFP 100 after completing a data processing using the 1st search condition.

In step S33, the CPU 101 sets the 2nd search condition having the second highest priority as next judgment condition, and reset article images in the storage unit 102 so that the process further continues from step S14.

In step S14, article images stored in the storage unit 102 are retrieved. If a plurality of article images is stored in the storage unit 102, an article image having a first identification number is retrieved at first. And then steps S14 to S32 are repeated using the 2nd search condition as similar to the 1st search condition.

Because article images can be selected for each of the 1st search condition and the 2nd search condition by conducting the process shown in FIG. 13, the output list may include and arrange article images corresponding to the 1st search condition and then article images corresponding to the 2nd search condition sequentially, for example.

If the CPU 101 determines that no further search condition is set to the MFP 100 (No in step S32), the process goes to step S20 of FIG. 6, and steps S20 to S27 of FIG. 6 are conducted.

FIG. 14 shows example output article images, output by the MFP 100 using two documents shown in FIGS. 4A and 4B.

If a first search condition (or search condition 1) including expiry date information "after 2006/09/01" having the highest priority, and a second search condition (or search condition 2) including field information "automobile" having the second priority are registered to the MFP 100, two article images of "B" and "E" corresponding to the first search condition for expiry date information are consolidated and output on one sheet or page, and then two article images of "A" and "C" corresponding to the second search condition for field information are consolidated and output on another sheet or page as shown in FIG. 14.

The process shown in FIG. 13 may be conducted similarly as the processes shown in FIG. 5 or FIG. 6A/6B, and may have similar effects.

In addition, the process shown in FIG. 13, a plurality of search conditions is set and registered to the MFP 100, and article images may be consolidated and output for each of the corresponding search conditions.

Furthermore, because article images can be consolidated and output for each of the corresponding search conditions having assigned with priority order, article images can be output from the MFP 100 in such priority order. For example, article images selected by one search condition having the highest priority order are output from the MFP 100 at first, and then article images selected by another search condition having the second highest priority order are output from the MFP 100.

With such process for outputting consolidated article images, article images selected by one search condition can be viewed consecutively, and article images selected by another search condition can be viewed consecutively, by which a user can look article images having similar attribution efficiently.

Furthermore, such priority order can be used for outputting article images with any given order. For example, article images having higher priority may be output at an earlier timing compared to article images having lower priority, wherein such priority order may be selected by a user or the MFP 100, for example.

As such, the process shown in FIG. 13 may have an image sorting function, which outputs article images in a given order, which is desirable for a user.

The above-described image sorting process may also be incorporated to the process shown in FIG. 11.

For example, after completing a selection of article images using a plurality of search conditions (see steps S17a, S17b, S17n) in the process shown in FIG. 11, the selected article images may be rearranged by setting a priority order to each of the search conditions although such rearrangement may need some additional controlling of data processing.

Such image sorting process may be preferably used when to sort a smaller number of relevant article images from a large number of article images because article images not related to a search condition can be sort out at an early stage of the process, by which a user can conduct a data processing by the MFP 100 more efficiently.

Although various exemplary embodiments are described separately in this disclosure, such exemplary embodiments may be combined each other depending on a needs of image searching operation, which may be determined by a user, for example.

The MFP 100 according to the above-described exemplary embodiments may be an image forming apparatus such as digital copier, a facsimile having a scanner, a printer, a personal computer connectable to an image scanning apparatus, and an image processing unit such as scanner, for example, but not limited to these.

Although the above described embodiments uses document sheets (e.g., paper) having articles thereon as original image having mark data to be input to the MFP 100, image data having mark data may also be input or loaded in the MFP 100 without using such document sheets. For example, electronic image data having mark data can be input to the MFP 100 with known methods. After loading such electronic image data in the MFP 100, the above-described data processing (e.g., dividing of images, assigning of identification number) can be similarly conducted to search and distribute article images to relevant persons. Such electronic image data may be images, taken by an image capturing apparatus (e.g., digital camera) and input to the MFP 100 by connecting the image capturing apparatus to the MFP 100 with a given connection device such as USB (universal serial bus), for example. Other electronic image data may be similarly used for the MFP 100. In case of inputting such electronic image data to the MFP 100, a scanning operation by a scanner can be omitted.

The above-described data processing may be implemented by a controller of an image processing apparatus using a computer program, which includes functions such as mark data processing, mark data analysis, matching judgment or determination, article image selection, user verification, search condition registration, article image consolidation, and priority order assignment.

Embodiments of the present disclosure may be conveniently implemented using a conventional general purpose digital computer programmed according to the teachings of the present disclosure, as will be apparent to those skilled in the computer art. Appropriate software coding can readily be prepared by skilled programmers based on the teachings of the present disclosure, as will be apparent to those skilled in the software art. Embodiments of the present disclosure may also be implemented by the preparation of application specific integrated circuits or by interconnecting an appropriate network of conventional component circuits, as will be readily apparent to those skilled in the art.

Still further, any one of the above described and other exemplary features of the present disclosure may be embodied in the form of an apparatus, method, system, computer program or computer program product. For example, the aforementioned methods may be embodied in the form of a system or device, including, but not limited to, any of the structures for performing the methodology illustrated in the drawings.

Even further, any of the aforementioned methods may be embodied in the form of a program. The program may be stored on a computer readable medium and configured to perform any one of the aforementioned methods when run on a computer device (a device including a processor). Thus, the storage medium or computer readable medium can be configured to store information and interact with a data processing facility or computer device to perform the method of any of the above-described embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media (such as CD-ROMs and DVDs), magneto-optical storage media (such as MOs), magnetic storage media (including but not limited to floppy diskettes, cassette tapes, and removable hard disks), media with a built-in rewriteable non-volatile memory (including but not limited to memory cards), and media with a built-in ROM (including but not limited to ROM cassettes), etc. Furthermore, various information regarding stored images, for example, property information, may be stored in any other form, or provided in other ways.

Further, the program may be stored on a storage medium or storage unit of an external apparatus, and such program can be downloaded from the external apparatus via a network and implemented.

Numerous additional modifications and variations are possible in light of the above teachings. It is therefore to be understood that, within the scope of the appended claims, the disclosure of this application may be practiced otherwise than as specifically described herein. For example, elements and/or features of different examples and illustrative embodiments may be combined each other and/or substituted for each other within the scope of this disclosure and appended claims.

What is claimed is:

1. An image processing apparatus, comprising:
    a storage unit configured to store article images, embedded with mark data and loaded in the image processing apparatus, the mark data being a graphical mark which includes therein encoded data and is a machine readable representation of the encoded data;
    an input unit configured to input at least one search information element used for searching for a given article image among the stored article images;
    a reading unit configured to read mark data of each article image stored in the storage unit;
    a controller configured with an analysis function, a determination function, and a selection function; and
    an output unit configured to output an article image selected by the selection function,
    wherein, in the analysis function, the mark data read by the reading unit is analyzed,
    in the determination function, the read mark data is compared with the at least one search information element based on an analysis of the mark data and is checked to determine whether the read mark data includes an information element matching the at least one search information element input by the input unit, and
    in the selection function, an article image having the read mark data matched to the at least one search information element is selected based on a determination of the determination function.

2. The image processing apparatus according to claim 1, wherein the search information element includes field information.

3. The image processing apparatus according to claim 1, wherein the search information element includes author information.

4. The image processing apparatus according to claim 1, wherein the search information element includes creation date information.

5. The image processing apparatus according to claim 1, wherein the search information element includes expiry date information.

6. The image processing apparatus according to claim 1, wherein the search information element includes designated viewer information designating a group or a person as a designated viewer.

7. The image processing apparatus according to claim 1, wherein the input unit includes an operation device operable by a user.

8. An image processing apparatus, comprising:
    a storage unit configured to store article images, embedded with mark data and loaded in the image processing apparatus;
    an input unit configured to input at least one search information element used for searching for a given article image among the stored article images;
    a reading unit configured to read mark data of each article image stored in the storage unit;
    a controller configured with an analysis function, a determination function, and a selection function; and
    an output unit configured to output an article image selected by the selection function,
    wherein, in the analysis function, the mark data read by the reading unit is analyzed,
    in the determination function, the read mark data is compared with the at least one search information element based on an analysis of the mark data and is checked to determine whether the read mark data includes an information element matching the at least one search information element input by the input unit, and
    in the selection function, an article image having the read mark data matched to the at least one search information element is selected based on a determination of the determination function,
    wherein the controller further comprises a verification function, wherein user authentication information input to the image processing apparatus is checked to determine whether the input user authentication information matches user information registered in the image processing apparatus, and when the user authentication information is verified as authentic, a corresponding user name is used as a search information element.

9. The image processing apparatus according to claim 8, wherein the controller further comprises a registration function, wherein at least one search information element for the user name verified by the verification function is registered to the image processing apparatus as registered search information element,
    wherein the registered search information is checked with the read mark data in the determination function, and when the registered search information element matches the read mark data, an article image having the read mark data is selected in the selection function and output by the output unit as the selected article image.

10. The image processing apparatus according to claim 1, wherein:

the storage unit stores the article images as a group of discrete article images embedded with mark data, each of the discrete article images being prepared by dividing images loaded in the image processing apparatus; and the reading unit sequentially reads mark data of each of the discrete article images.

11. The image processing apparatus according to claim 10, wherein the controller further comprises a consolidation function used for consolidating at least two discrete article images selected by the selection function into a single page of data.

12. The image processing apparatus according to claim 11, wherein the output unit outputs the consolidated discrete article images separately for a first search information element and a second search information element.

13. The image processing apparatus according to claim 12, wherein the controller further comprises a priority assignment function used for assigning a priority order to the first search information element and the second search information element, the output unit outputs consolidated discrete article images matching the first search information element, and separately outputs consolidated discrete article images matching the second search information element based on the assigned priority order.

14. The image processing apparatus according to claim 1, further comprising an image scanner used for loading the article images in the image processing apparatus.

15. The image processing apparatus according to claim 1, wherein the article images are loaded in the image processing apparatus from an electronic device connected to the image processing apparatus.

16. A method of selecting an article image with an image processing apparatus loaded with article images, comprising:

reading mark data provided to each of the article images, the mark data being a graphical mark which includes therein encoded data and is a machine readable representation of the encoded data;

analyzing the read mark data;

inputting a search information element used for searching for a given article image;

determining whether the read mark data includes an information element matching the input search information element based on a result of the analyzing;

selecting an article image having the read mark matching the input search information element based on a result of the determining; and outputting the selected article image.

17. A non-transitory computer program product stored on a computer-readable storage medium for causing a computer to execute a method of selecting an article image with an image processing apparatus loaded with article images, the method comprising:

reading mark data provided to each of the article images, the mark data being a graphical mark which includes therein encoded data and is a machine readable representation of the encoded data;

analyzing the read mark data;

inputting a search information element used for searching for a given article image;

determining whether the read mark data includes an information element matching the input search information element based on a result of the analyzing;

selecting an article image having the read mark matching the input search information element based on a result of the determining; and outputting the selected article image.

18. The image processing apparatus according to claim 1, wherein the mark data includes a bar code.

19. The image processing apparatus according to claim 1, wherein the mark data includes a watermark.

20. The method of claim 16, further comprising:

verifying user authentication information input to the image processing apparatus to determine whether the input user authentication information matches user information registered in the image processing apparatus, and when the user authentication information is verified as authentic, a corresponding user name is used as a search information element.

* * * * *